(12) United States Patent
Matsumoto et al.

(10) Patent No.: US 11,549,028 B2
(45) Date of Patent: Jan. 10, 2023

(54) INKJET RECORDING METHOD

(71) Applicant: KAO CORPORATION, Tokyo (JP)

(72) Inventors: Yuta Matsumoto, Cincinnati, OH (US); Azusa Kuroda, Nakayama (JP); Kazuki Ishida, Sapporo (JP)

(73) Assignee: KAO CORPORATION, Tokyo (JP)

( * ) Notice: Subject to any disclaimer, the term of this patent is extended or adjusted under 35 U.S.C. 154(b) by 318 days.

(21) Appl. No.: 16/957,487

(22) PCT Filed: Dec. 14, 2018

(86) PCT No.: PCT/JP2018/046101
§ 371 (c)(1),
(2) Date: Jun. 24, 2020

(87) PCT Pub. No.: WO2019/131215
PCT Pub. Date: Jul. 4, 2019

(65) Prior Publication Data
US 2021/0071021 A1 Mar. 11, 2021

(30) Foreign Application Priority Data
Dec. 28, 2017 (JP) .............................. JP2017-254822

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/2107* (2013.01); *C09D 11/102* (2013.01); *C09D 11/107* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005;
(Continued)

(56) References Cited

U.S. PATENT DOCUMENTS

| | | | |
|---|---|---|---|
| 2010/0086692 A1* | 4/2010 | Ohta | C09D 11/322 427/256 |
| 2010/0196601 A1 | 8/2010 | Goto et al. | |
| 2012/0176455 A1* | 7/2012 | Ohta | B41M 5/0011 347/102 |
| 2012/0249668 A1 | 10/2012 | Denda et al. | |
| 2013/0070031 A1 | 3/2013 | Nelson et al. | |
| 2014/0253618 A1 | 9/2014 | Masuda et al. | |
| 2015/0115202 A1* | 4/2015 | Kagata | C09D 11/40 252/301.36 |

(Continued)

FOREIGN PATENT DOCUMENTS

| | | |
|---|---|---|
| CN | 101541895 A | 9/2009 |
| CN | 102729676 A | 10/2012 |

(Continued)

OTHER PUBLICATIONS

International Search Report issued in PCT/JP2018/046101 (PCT/ISA/210), dated Jan. 22, 2019.

(Continued)

*Primary Examiner* — Manish S Shah
(74) *Attorney, Agent, or Firm* — Birch, Stewart, Kolasch & Birch, LLP

(57) ABSTRACT

The present invention relates to an ink-jet printing method of overprinting a first ink and a second ink on a low-liquid absorbing printing medium, in which the first ink and the second ink are respectively in the form of a water-based ink containing a colorant (A), a polymer (B), an organic solvent (C) and water, and satisfy the following formulae (1) and (2), said ink-jet printing method including the steps of forming characters or images using at least one ink as the first ink, and then forming a background image using the second ink such that the background image is superimposed on at least a part of the characters or images formed by the first ink: $[T_2-T_1]<0$ mN/m (1); and $[V_2-V_1]\geq 1.0$ mPa·s (2) wherein $T_2$ is the static surface tension of the second ink; $T_1$ is the static surface tension of the first ink; $V_2$ is the viscosity of the second ink as measured at 32° C.; and $V_1$ is the viscosity of the first ink as measured at 32° C. According to the method of the present invention, it is possible to obtain good printed characters or images that are excellent in uniformity of solid image printing and suffer from less intercolor bleeding.

11 Claims, No Drawings

(51) Int. Cl.
*C09D 11/102* (2014.01)
*C09D 11/107* (2014.01)
*B41J 2/21* (2006.01)

(58) Field of Classification Search
CPC ....... C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436
See application file for complete search history.

(56) References Cited

U.S. PATENT DOCUMENTS

| | | | |
|---|---|---|---|
| 2015/0138271 A1 | 5/2015 | Fukuda et al. | |
| 2015/0191614 A1 | 7/2015 | Nagashima et al. | |
| 2015/0197654 A1* | 7/2015 | Okuda | B41M 5/0017 524/88 |
| 2015/0275014 A1* | 10/2015 | Yamazaki | C09D 11/322 347/20 |
| 2015/0337149 A1 | 11/2015 | Wakabayashi et al. | |
| 2016/0222236 A1* | 8/2016 | Nakagawa | C09D 11/107 |
| 2016/0272834 A1* | 9/2016 | Kobayashi | C09D 11/40 |
| 2019/0126657 A1* | 5/2019 | Kuroda | B41M 5/0011 |
| 2019/0134989 A1* | 5/2019 | Matsumoto | B41J 2/2117 |

FOREIGN PATENT DOCUMENTS

| | | |
|---|---|---|
| CN | 104884549 A | 9/2015 |
| JP | 2005-154607 A | 6/2005 |
| JP | 2009-292138 A | 12/2009 |
| JP | 2013-82885 A | 5/2013 |
| JP | 2014-91795 A | 5/2014 |
| JP | 2015-147919 A | 8/2015 |
| JP | 2018-203905 A | 12/2018 |
| WO | WO 2017/138437 A1 | 8/2017 |
| WO | WO 2017/138438 A1 | 8/2017 |
| WO | WO 2017/138439 A1 | 8/2017 |
| WO | WO 2017/217540 A1 | 12/2017 |
| WO | WO 2017/217541 A1 | 12/2017 |

OTHER PUBLICATIONS

Extended European Search Report for European Application No. 18894103.3, dated Aug. 25, 2021.

* cited by examiner

INKJET RECORDING METHOD

FIELD OF THE INVENTION

The present invention relates to an ink-jet printing method and an ink set.

BACKGROUND OF THE INVENTION

In ink-jet printing methods, droplets of ink are directly ejected onto a printing medium from very fine nozzles and allowed to adhere onto the printing medium to form characters or images thereon. The ink-jet printing methods have become rapidly spread because of various advantages such as easiness of full coloration, low cost, capability of using a plain paper as the printing medium, non-contact with the printed characters or images, etc.

On the other hand, it has been required to print characters or images not only on a high-liquid absorbing printing medium such as those printing media conventionally called a plain paper or a copying paper, but also on a printing medium for commercial printing purposes such as a low-liquid absorbing coated paper such as an offset coated paper or a non-liquid absorbing resin film such as a polyvinyl chloride resin film, a polypropylene resin film, a polyester resin film, etc. In particular, in the case of conducting the printing on a printing medium having a non-white ground such as a resin film, etc., a white ink has been used for the purpose of enhancing visibility of color images printed thereon.

When printing characters or images on the low-liquid absorbing or non-liquid absorbing printing medium, a solvent-based pigment ink using an organic solvent as a dispersing medium and a UV-curing ink have been mainly employed conventionally. However, these conventional inks tend to have such a problem that a considerable amount of the organic solvent is diffused into atmospheric air upon drying of the solvent-based pigment ink to thereby cause adverse influence on environments, or a radical initiator or monomers used in the UV-curing ink pose a risk concerning safety. For this reason, at the present time, development of a water-based ink having a less burden on working environments and natural environments has proceeded.

For example, JP 2009-292138A (Patent Literature 1) discloses an ink-jet printing method that is capable of carrying out raised or embossed printing without occurrence of ink bleeding even when using no special print head, in which at least two kinds of aqueous inks which are different in viscosity from each other are used to form two or more print layers in a printing region of a printing medium, and the ink having a lowest viscosity is used to form the print layer contacting with a surface of the printing medium.

JP 2005-154607A (Patent Literature 2) discloses a printing method using an ink set that is excellent in anti-bleeding properties, rub fastness, etc., and is constituted of water-based inks all containing respective water-insoluble colorants having the same ionicity and including at least one combination of the inks whose viscosities are adjusted such that a difference between a viscosity of one ink and a viscosity of the other ink is 0.7 to 4 mPa·s, in which when printing different color inks adjacent to each other using the ink set, the ink having a lower viscosity is first ejected, and then the ink having a higher viscosity is ejected.

JP 2013-82885A (Patent Literature 3) discloses an ink-jet printing method that is excellent in adhesion properties to a plastic film, and is free of cissing of ink on images even when overprinting the ink on a color ink, etc., in which a print layer is formed on a non-absorptive substrate by an ink-jet printing method using an aqueous white ink containing a white pigment, a pigment dispersant formed of a hydrophilic group-containing styrene-based copolymer, a binder and water, and a color ink having a different color from that of the aqueous white ink. In addition, in the Patent Literature 3, it is also described that the surface tension of the white ink is lower than that of the color ink.

SUMMARY OF THE INVENTION

The present invention relates to an ink-jet printing method of overprinting a first ink and a second ink on a low-liquid absorbing printing medium, in which:

the first ink and the second ink are respectively in the form of a water-based ink containing a colorant (A), a polymer (B), an organic solvent (C) and water; and a static surface tension and a viscosity of the first ink and a static surface tension and a viscosity of the second ink satisfy a relationship represented by the following formulae (1) and (2):

$$[T_2 - T_1] < 0 \text{ mN/m} \quad (1); \text{ and}$$

$$[V_2 - V_1] \geq 1.0 \text{ mPa·s} \quad (2),$$

wherein $T_2$ is the static surface tension of the second ink; $T_1$ is the static surface tension of the first ink; $V_2$ is the viscosity of the second ink as measured at 32° C.; and $V_1$ is the viscosity of the first ink as measured at 32° C., said ink-jet printing method including the steps of forming characters or images using at least one ink as the first ink, and then forming a background image using the second ink such that the background image is superimposed on at least a part of the characters or images formed by the first ink.

DETAILED DESCRIPTION OF THE INVENTION

Hitherto, in the case of conducting so-called reverse printing in which color images are formed on a transparent printing medium and then a background solid image is printed so as to superimpose the background solid image over the color images, there tends to occur such a problem that if the reverse printing is conducted by an ink-jet printing method using a water-based ink, the hiding power of the printed color images by the background image tends to be deteriorated owing to insufficient uniformity of solid image printing of an ink for the background image, or bleeding between the ink and the printed images is caused, so that it is difficult to obtain a good printed material.

In the technologies described in the Patent Literatures 1 to 3, in fact, it was not possible to form characters or images having a fully satisfactory image quality on a low-liquid absorbing or non-liquid absorbing printing medium.

For example, the Patent Literature 1 aims at obtaining a printed material having a raised print layer that can be mechanically detected, and therefore is not concerned with the image quality of the printed characters or images obtained when using a low-liquid absorbing or non-liquid absorbing printing medium. In the Patent Literature 2, there is described the technology of controlling a penetration velocity of the ink into a paper, which therefore is not concerned with the printing on a low-liquid absorbing or non-liquid absorbing printing medium. In the technology of the Patent Literature 3, in the case where the characters or images formed by the reverse printing are not dried after the printing, the hiding power by the white ink for the background image tend to be insufficient, and it also tends to be insufficient to suppress occurrence of intercolor bleeding therein.

An object of the present invention is to provide an ink-jet printing method in which by suitably controlling properties of two or more water-based inks, it is possible to obtain good printed characters or images that are excellent in uniformity of solid image printing of a background image upon reverse printing and suffer from less intercolor bleeding, and an ink set.

Meanwhile, in the present invention, the uniformity of solid image printing of the background image upon reverse printing as used herein is intended to include the influence of hiding power of the image.

The present inventors have found that by controlling a static surface tension and a viscosity of a first ink and a static surface tension and a viscosity of a second ink so as to satisfy a specific relationship, it is possible to solve the aforementioned conventional problems.

That is, the present invention relates to the following aspects [1] and [2].

[1] An ink-jet printing method of overprinting a first ink and a second ink on a low-liquid absorbing printing medium, in which:

the first ink and the second ink are respectively in the form of a water-based ink containing a colorant (A), a polymer (B), an organic solvent (C) and water; and a static surface tension and a viscosity of the first ink and a static surface tension and a viscosity of the second ink satisfy a relationship represented by the following formulae (1) and (2):

$$[T_2-T_1]<0 \text{ mN/m} \quad (1); \text{ and}$$

$$[V_2-V_1]\geq 1.0 \text{ mPa·s} \quad (2),$$

wherein $T_2$ is the static surface tension of the second ink; $T_1$ is the static surface tension of the first ink; $V_2$ is the viscosity of the second ink as measured at 32° C.; and $V_1$ is the viscosity of the first ink as measured at 32° C., said ink-jet printing method including the steps of forming characters or images using at least one ink as the first ink, and then forming a background image using the second ink such that the background image is superimposed on at least a part of the characters or images formed by the first ink.

[2] An ink set containing at least one first ink and a second ink, in which the first ink is an ink for forming characters or images, and the second ink is an ink for forming a background image;

the first ink and the second ink are respectively in the form of a water-based ink containing a colorant (A), a polymer (B), an organic solvent (C) and water; and a static surface tension and a viscosity of the first ink and a static surface tension and a viscosity of the second ink satisfy a relationship represented by the aforementioned formulae (1) and (2).

In accordance with the present invention, there are provided an ink-jet printing method by which it is possible to print good characters or images that are excellent in uniformity of solid image printing of a background image upon reverse printing and suffer from less intercolor bleeding, and an ink set.

[Ink-Jet Printing Method]

The ink-jet printing method of the present invention is characterized by overprinting a first ink and a second ink on a low-liquid absorbing printing medium, in which:

the first ink and the second ink are respectively in the form of a water-based ink containing a colorant (A), a polymer (B), an organic solvent (C) and water; and a static surface tension and a viscosity of the first ink and a static surface tension and a viscosity of the second ink satisfy a relationship represented by the following formulae (1) and (2):

$$[T_2-T_1]<0 \text{ mN/m} \quad (1); \text{ and}$$

$$[V_2-V_1]\geq 1.0 \text{ mPa·s} \quad (2),$$

wherein $T_2$ is the static surface tension of the second ink; $T_1$ is the static surface tension of the first ink; $V_2$ is the viscosity of the second ink as measured at 32° C.; and $V_1$ is the viscosity of the first ink as measured at 32° C., said ink-jet printing method including the steps of forming characters or images using at least one ink as the first ink, and then forming a background image using the second ink such that the background image is superimposed on at least a part of the characters or images formed by the first ink.

In the aforementioned formulae, $[T_2-T_1]$ means the value obtained by subtracting the static surface tension of the first ink from the static surface tension of the second ink, and $[V_2-V_1]$ means the value obtained by subtracting the viscosity of the first ink as measured at 32° C. from the viscosity of the second ink as measured at 32° C.

When the characters or images are printed by the two or more first inks, it may be sufficient that at least one of the first inks satisfies the formulae (1) and (2), and it is preferred that a larger number of inks among the first inks satisfy the formulae (1) and (2). For example, in the case where the two or more first inks are used, it is preferred that the two or more first inks satisfy the formulae (1) and (2). Also, in the case where the 4 or more first inks are used, it is preferred that the number of the first inks which can satisfy the formulae (1) and (2) is preferably 2 or more, more preferably 3 or more and even more preferably 4 or more.

Furthermore, when the characters or images are printed by the two or more first inks, it is more preferred that all of the first inks satisfy the formula (1), and at least one of the first inks satisfies the formula (2).

In addition, when the two or more first inks are sequentially ejected to print the characters or images, and then the second ink is ejected and printed to superimpose the second ink on the characters or images printed by the first ink, it is more preferred that the last ejected ink among the first inks satisfies the formulae (1) and (2).

Meanwhile, the term "water-based" as used in the present specification means such a condition that water has a largest content among components of a medium contained in the ink, and the medium may be constituted of water solely, or may be in the form of a mixed solvent containing water and at least one organic solvent.

Also, the term "printing" means a concept that includes printing or typing operation for printing characters or images, and the term "printing medium" means a concept that includes printed matters or typed materials on which characters or images are printed.

In addition, the term "low-liquid absorbing" as used in the present specification is intended to include both concepts of low-liquid absorbing properties and non-liquid absorbing properties for water and/or ink, and the "low-liquid absorbing" may be evaluated by a water absorption of a printing medium using pure water. More specifically, the "low-liquid absorbing" means that the printing medium has a water absorption of not less than 0 g/m² and not more than 10 g/m², preferably not less than 0 g/m² and not more than 6 g/m², as measured under the condition that a contact time between the printing medium and pure water is 100 milliseconds. Incidentally, the aforementioned water absorption of the printing medium may be measured by the method described in Examples below.

The ink-jet printing method of the present invention can exhibit the effect of obtaining good printed characters or images that are excellent in uniformity of solid image printing of a background image upon reverse printing and suffer from less intercolor bleeding. The reason why the aforementioned advantageous effect can be attained by the present invention is considered as follows though it is not clearly determined yet.

That is, it is considered that in order to improve uniformity of solid image printing of an ink for a background image, it is effective to enhance wettability of the ink to a non-image bearing portion of the low-liquid absorbing printing medium. For this reason, studies have been made to reduce the surface tension of the ink or decrease the viscosity of the ink. However, the conventional studies have failed to attain fully satisfactory results and eliminate problems concerning bleeding between the background ink and color inks for forming the characters or images.

Under these circumstances, in the present invention, after forming the characters or images on the low-liquid absorbing printing medium using the first ink (image-forming ink), the second ink (ink for a background image) having such static surface tension and viscosity that a difference in static surface tension between the first ink and the second ink is smaller than a specific value, and a difference in viscosity between the first ink and the second ink is larger than a specific value, is used to form the background image, so that it is possible to satisfy both of improvement in uniformity of solid image printing of the second ink and suppression of bleeding of the second ink with the first ink. The reason therefor is considered to be that by reducing the static surface tension of the second ink (ink for the background image), dots formed by droplets of the second ink subsequently impacted on the low-liquid absorbing printing medium which are superimposed on dots formed by droplets of the first ink (image-forming ink) previously impacted on the low-liquid absorbing printing medium, undergo promoted expansion. On the other hand, it is considered that by increasing the viscosity of the second ink (ink for the background image), the velocity of expansion of droplets of the second ink impacted on the low-liquid absorbing printing medium is suppressed to adequately control the balance between these properties of both the inks, so that it is possible to obtain good printed characters or images which suffer from less intercolor bleeding.

[Water-Based Ink]

In the ink-jet printing method of the present invention, there are used the first ink and the second ink which both are in the form of a water-based ink that contains a colorant (A), a polymer (B) for dispersing the colorant, an organic solvent (C) and water (hereinafter also referred to merely as an "ink").

The first ink is an ink for forming characters or images upon reverse printing, and is formed of one or more inks. For example, as the first ink, there may be used 3 or more inks for forming full color images. The second ink is an ink for forming a background image upon reverse printing. As the second ink, there is usually used a single ink. However, for example, 2 or more inks may be used as the second ink for the purpose of forming such a background image having a stripe pattern, etc.

<Colorant (A)>

Examples of the colorant (A) used in the present invention include a pigment and a hydrophobic dye. From the viewpoint of improving water resistance of the resulting ink, among these colorants, the pigment is preferably used. The pigment may be either an inorganic pigment or an organic pigment. The inorganic or organic pigment may also be used in combination with an extender pigment, if required.

Examples of the inorganic pigment include carbon blacks, metal oxides, metal sulfides, metal chlorides and the like Of these inorganic pigments, in particular, carbon blacks are preferably used for black inks. Examples of the carbon blacks include furnace blacks, thermal lamp blacks, acetylene blacks, channel blacks and the like.

In the white ink, there may be used white pigments such as titanium oxide, zinc oxide, silica, alumina, magnesium oxide and the like. Among these white pigments, preferred is titanium oxide having excellent hiding power.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like. The hue of the organic pigment used in the present invention is not particularly limited, and there may be used any chromatic pigments having a yellow color, a magenta color, a cyan color, a blue color, a red color, an orange color, a green color, etc. Specific examples of the preferred chromatic organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green with various product numbers.

In the present invention, the first ink preferably contains at least one pigment selected from the group consisting of chromatic pigments and a black pigment and more preferably at least one pigment selected from the group consisting of chromatic pigments and carbon black. In addition, the second ink preferably contains a white pigment, more preferably a white inorganic pigment and even more preferably titanium oxide.

The average particle size of the respective chromatic pigments and black pigment in the first ink is preferably not less than 60 nm and not more than 180 nm form the viewpoint of improving tinting power and dispersion stability of the resulting ink. The average particle size of the white pigment in the second ink is preferably not less than 150 nm and not more than 400 nm form the viewpoint of improving whiteness of the resulting second ink.

The aforementioned pigments may be used alone or in the form of a mixture of any two or more thereof.

The colorant (A) used in the present invention, preferably the chromatic pigments and black pigment, can be preferably used in at least one configuration selected from the group consisting of (i) a self-dispersible pigment, and (ii) particles formed by dispersing a pigment with a polymer dispersant. In particular, from the viewpoint of obtaining good printed characters or images which are excellent in uniformity of solid image printing and suffer from less intercolor bleeding, the colorant (A) is more preferably contained in the water-based ink in the form of (iii) particles of a water-insoluble polymer (BX) containing a pigment (hereinafter also referred to merely as a "pigment-containing polymer particles"). As the polymer for the polymer dispersant and the water-insoluble polymer (BX), there may be used the polymer (B).

The self-dispersible pigment (i) means a pigment onto a surface of which at least one hydrophilic functional group is bonded either directly or through the other atom group such as an alkanediyl group, etc., to thereby render the pigment dispersible in a water-based medium without using a surfactant or a resin. Specific examples of commercially available products of the self-dispersible pigment include "CAB-O-JET" series products available from Cabot Japan K.K.

Examples of the particles (ii) formed by dispersing the pigment with the polymer (B) include 1) particles formed by kneading the pigment and the polymer and then dispersing the resulting kneaded material in a medium such as water, etc.; 2) particles formed by stirring the pigment and the polymer in a medium such as water, etc., to disperse the pigment in the medium such as water, etc.; 3) particles formed by mechanically dispersing a polymer raw material and the pigment to polymerize the polymer raw material and then dispersing the pigment in a medium such as water, etc., with the resulting polymer; and the like.

In addition, from the viewpoint of improving storage stability of the particles in the resulting water-based ink, a crosslinking agent may be added to the particles formed by dispersing the pigment with the polymer (B) to subject the polymer (B) to crosslinking reaction.

[Polymer (B)]

The polymer (B) may be used as a pigment dispersing polymer (B-1) for dispersing the pigment and a fixing aid polymer (B-2) for improving fixing properties of the printed characters or images. These polymers (B-1) and (B-2) may also be used in combination with each other.

As the polymer (B), there may be mentioned at least one polymer selected from the group consisting of condensation-based resins such as polyurethanes, polyesters, etc.; and vinyl-based polymers such as acrylic resins, styrene-based resins, styrene-acrylic resins, butadiene-based resins, styrene-butadiene-based resins, vinyl chloride-based resins, vinyl acetate-based resins and acrylic-silicone-based resins, etc. Among these polymers, preferred are vinyl-based polymers.

The weight-average molecular weight of the polymer (B) is preferably not less than 10,000, more preferably not less than 20,000, even more preferably not less than 30,000 and further even more preferably not less than 40,000, and is also preferably not more than 2,500,000 and more preferably not more than 1,000,000, from the viewpoint of improving dispersibility of the pigment as well as from the viewpoint of improving fixing properties of the resulting printed characters or images.

<Pigment Dispersing Polymer (B-1)>

As the pigment dispersing polymer (B-1), from the viewpoint of improving dispersion stability of the pigment, preferred are vinyl-based polymers that are obtained by addition-polymerizing a vinyl monomer (such as a vinyl compound, a vinylidene compound and a vinylene compound). The pigment dispersing polymer (B-1) used herein may be in the form of either an appropriately synthetized product or a commercially available product.

The weight-average molecular weight of the pigment dispersing polymer (B-1) is preferably not less than 20,000, more preferably not less than 30,000 and even more preferably not less than 40,000, and is also preferably not more than 500,000, more preferably not more than 300,000 and even more preferably not more than 200,000, from the viewpoint of improving dispersibility of the pigment.

<Fixing Aid Polymer (B-2)>

The fixing aid polymer (B-2) is preferably used in the form of pigment-free polymer particles. The dispersion of the fixing aid polymer (B-2) serves for forming a film of the ink on a printing medium to thereby improve fixing properties of the ink.

As the fixing aid polymer (B-2), there are preferably used vinyl-based polymers. Among these vinyl-based polymers, from the viewpoint of promoting drying of the ink on a printing medium and improving fixing properties of the resulting printed characters or images, preferred are acrylic polymers.

In addition, from the viewpoint of enhancing productivity of the water-based ink, the fixing aid polymer (B-2) is preferably used in the form of a dispersion liquid containing the polymer particles. As the fixing aid polymer (B-2), there may be used either synthetized products obtained, for example, by emulsion polymerization method, etc., or commercially available products.

Examples of the commercially available products of the fixing aid polymer (B-2) include acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd., etc.; styrene-butadiene resins such as "SR-100" and "SR-102" both available from Nippon A & L Inc., etc.; styrene-acrylic resins such as "JONCRYL 7100", "JONCRYL 7600", "JONCRYL 537J", "JONCRYL 538J", "JONCRYL 780" and "JONCRYL PDX-7164" all available from BASF Japan, Ltd., etc.; and vinyl chloride-based resins such as "VINYBLAN 700" and "VINYBLAN 701" both available from Nissin Chemical Co., Ltd., etc.

The fixing aid polymer (B-2) may be used in the form of particles dispersed in water.

The weight-average molecular weight of the fixing aid polymer (B-2) is preferably not less than 10,000, more preferably not less than 20,000 and even more preferably not less than 30,000, and is also preferably not more than 2,500,000 and more preferably not more than 1,000,000, from the viewpoint of improving fixing properties of the resulting ink.

In addition, the average particle size of particles of the fixing aid polymer (B-2) in the dispersion or ink containing the particles of the fixing aid polymer (B-2) is preferably not less than 10 nm, more preferably not less than 30 nm and even more preferably not less than 50 nm, and is also preferably not more than 300 nm, more preferably not more than 200 nm, even more preferably not more than 150 nm and further even more preferably not more than 130 nm, from the viewpoint of improving storage stability of the resulting ink.

<Water-Insoluble Polymer (BX)>

The water-insoluble polymer (BX) is preferably used in the form of pigment-containing water-insoluble polymer particles ("pigment-containing polymer particles") from the viewpoint of obtaining good printed characters or images which are excellent in uniformity of solid image printing and suffer from less intercolor bleeding. The term "water-insoluble" as used herein means that when the polymer is dried to constant weight and then dissolved in 100 g of water at 25° C. until reaching a saturated concentration thereof, the polymer has a solubility in water of less than 10 g, preferably not more than 5 g and more preferably not more than 1 g. In the case where the water-insoluble polymer (BX) is an anionic polymer, the aforementioned solubility thereof means a solubility in water of the polymer whose anionic groups are neutralized completely (i.e., 100%) with NaOH.

As the water-insoluble polymer (BX), from the viewpoint of improving storage stability of the resulting ink, preferred is a vinyl-based polymer obtained by addition-polymerizing a vinyl monomer. The vinyl-based polymer is preferably a vinyl-based polymer that is produced by copolymerizing a monomer mixture containing (b-1) an ionic monomer and (b-2) a hydrophobic monomer. The vinyl-based polymer contains a constitutional unit derived from the component (b-1) and a constitutional unit derived from the component (b-2). The water-insoluble polymer (BX) may further contain at least one constitutional unit selected from the group consisting of a constitutional unit derived from (b-3) a macromonomer and a constitutional unit derived from (b-4) a nonionic monomer.

Examples of the ionic monomer (b-1) include anionic monomers and cationic monomers. Among these monomers, preferred are anionic monomers. Examples of the anionic monomers include carboxylic acid monomers, sulfonic acid monomers, phosphoric acid monomers and the like.

Specific examples of the carboxylic acid monomers include acrylic acid, methacrylic acid, crotonic acid, itaconic acid, maleic acid, fumaric acid, 2-methacryloyloxymethyl-succinic acid and the like. Among the aforementioned anionic monomers, from the viewpoint of improving dispersion stability of the resulting ink, preferred are the carboxylic acid monomers, and more preferred are acrylic acid and methacrylic acid.

As the hydrophobic monomer (b-2), there may be mentioned at least one monomer selected from the group consisting of alkyl (meth)acrylic acid esters, aromatic group-containing monomers and the like.

The alkyl (meth)acrylic acid esters are preferably those alkyl (meth)acrylic acid esters containing an alkyl group having 1 to 22 carbon atoms. Examples of the alkyl (meth) acrylic acid esters include methyl (meth)acrylate, ethyl (meth)acrylate, propyl (meth)acrylate, butyl (meth)acrylate, amyl (meth)acrylate, cyclohexyl (meth)acrylate, 2-ethyl-hexyl (meth)acrylate, octyl (meth)acrylate, decyl (meth) acrylate, dodecyl (meth)acrylate, (iso)stearyl (meth)acrylate and the like.

Meanwhile, the term "(meth)acrylate" as used herein means at least one compound selected from the group consisting of an acrylate and a methacrylate, and is hereinafter defined in the same way. In addition, the term "(iso)" as used herein means both the structure in which any group expressed by "iso" is present, and the structure in which any group expressed by "iso" is not present (i.e., normal).

The aromatic group-containing monomer is preferably a vinyl monomer containing an aromatic group having 6 to 22 carbon atoms which may contain a substituent group containing a hetero atom, and more preferably a styrene-based monomer and an aromatic group-containing (meth)acrylic acid ester.

As the styrene-based monomer, preferred are styrene, 2-methyl styrene and divinyl benzene, and more preferred is styrene. As the aromatic group-containing (meth)acrylic acid ester, preferred are benzyl (meth)acrylate and phenoxy-ethyl (meth)acrylate, and more preferred is benzyl (meth) acrylate.

The macromonomer (b-3) is in the form of a compound containing a polymerizable functional group at one terminal end thereof and having a number-average molecular weight of not less than 500 and not more than 100,000. The polymerizable functional group bonded to one terminal end of the macromonomer is preferably an acryloyloxy group or a methacryloyloxy group.

The macromonomer (b-3) preferably has a number-average molecular weight of not less than 1,000 and not more than 10,000. Meanwhile, the number-average molecular weight of the macromonomer (b-3) may be measured by gel permeation chromatography using polystyrenes as a reference standard substance.

As the macromonomer (b-3), from the viewpoint of improving dispersion stability of the resulting ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described as to the aforementioned hydrophobic monomer (b-2). Among these aromatic group-containing monomers, preferred are at least one compound selected from the group consisting of styrene and benzyl (meth) acrylate, and more preferred is styrene.

Specific examples of the styrene-based macromonomer include "AS-6(S)", "AN-6(S)" and "HS-6(S)" (tradenames) all available from Toagosei Co., Ltd., etc.

Examples of the nonionic monomer (b-4) include 2-hydroxyethyl (meth)acrylate, 3-hydroxypropyl (meth)acrylate, a polyalkylene glycol (meth)acrylate and the like. From the viewpoint of improving dispersion stability of the resulting ink, among these nonionic monomers, preferred is the polyalkylene glycol (meth)acrylate.

Examples of the polyalkylene glycol (meth)acrylate include polyalkylene glycol (meth)acrylates such as polypropylene glycol (n=2 to 30 wherein n represents an average molar number of addition of oxyalkylene groups: hereinafter defined in the same way) (meth)acrylate, polyethylene glycol (n=2 to 30) (meth) acrylate, etc.; alkoxy polyalkylene glycol (meth)acrylates such as methoxy polyethylene glycol (n=1 to 30) (meth)acrylate, etc.; phenoxy (ethylene glycol/propylene glycol copolymer) (n=1 to 30 in which n for ethylene glycol: 1 to 29) (meth)acrylate; and the like. Among these compounds, preferred is at least one compound selected from the group consisting of polypropylene glycol (n=2 to 30) (meth)acrylate, polyethylene glycol (n=2 to 30) (meth)acrylate and methoxy polyethylene glycol (n=1 to 30) (meth)acrylate.

Specific examples of commercially available products of the component (b-4) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation.

The aforementioned components (b-1) to (b-4) may be respectively used alone or in the form of a mixture of any two or more thereof.

The contents of the constitutional units derived from the components (b-1) to (b-4) in the water-insoluble polymer (BX) are as follows, from the viewpoint of improving dispersion stability of the resulting ink.

The content of the component (b-1) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

The content of the component (b-2) is preferably not less than 25% by mass, more preferably not less than 30% by mass and even more preferably not less than 35% by mass, and is also preferably not more than 60% by mass, more preferably not more than 55% by mass and even more preferably not more than 50% by mass.

The content of the component (b-3) is not less than 0% by mass, preferably not less than 5% by mass, more preferably not less than 8% by mass and even more preferably not less than 10% by mass, and is also preferably not more than 30% by mass, more preferably not more than 25% by mass and even more preferably not more than 20% by mass.

The content of the component (b-4) is not less than 0% by mass, preferably not less than 5% by mass, more preferably not less than 10% by mass and even more preferably not less than 15% by mass, and is also preferably not more than 50% by mass, more preferably not more than 45% by mass and even more preferably not more than 40% by mass.

[Production of Water-Insoluble Polymer (BX)]

The water-soluble polymer (BX) may be produced by copolymerizing the aforementioned monomers by known polymerization methods, for example, by a solution polymerization method. The water-insoluble polymer (BX) thus produced is preferably used as such in the form of a water-insoluble polymer solution without removing the solvent used in the polymerization reaction therefrom in order to use the organic solvent contained therein as an organic solvent in the below-mentioned step 1, from the viewpoint of enhancing productivity of the below-mentioned water dispersion of the pigment-containing polymer particles.

The weight-average molecular weight of the water-insoluble polymer (BX) is preferably not less than 5,000, more preferably not less than 10,000 and even more preferably not less than 20,000, and is also preferably not more than 500,000, more preferably not more than 400,000, even more preferably not more than 300,000, further even more preferably not more than 200,000 and still further even more preferably not more than 100,000, from the viewpoint of obtaining good printed characters or images which are excellent in uniformity of solid image printing and suffer from less intercolor bleeding.

Examples of the configuration of the water-insoluble polymer (BX) present in the water-based ink include the particle configuration in which the pigment is enclosed (or encapsulated) in the polymer, the particle configuration in which the pigment is uniformly dispersed in the polymer, the particle configuration in which the pigment is exposed onto a surface of the respective polymer particles, the configuration in which the polymer is adsorbed onto the pigment, the configuration in which the polymer is not adsorbed onto the pigment, etc., as well as mixtures of these configurations. Among these configurations, from the viewpoint of improving dispersion stability of the pigment, in the present invention, the configuration of the pigment-containing polymer particles is preferred, and the pigment-enclosing configuration in which the pigment is enclosed in the water-insoluble polymer (BX) is more preferred.

[Production of Pigment-Containing Water-Insoluble Polymer (BX) Particles (Pigment-Containing Polymer Particles)]

The pigment-containing polymer particles can be efficiently produced in the form of a water dispersion thereof by the process including the following steps I and II, and further including the following step III as an optional step, if required.

Step I; subjecting a mixture containing the water-insoluble polymer (BX), an organic solvent, the pigment and water (hereinafter also referred to merely as a "pigment mixture") to dispersion treatment to obtain a dispersion of pigment-containing polymer particles;

Step II; removing the organic solvent from the dispersion obtained in the step I to obtain a water dispersion of the pigment-containing polymer particles (hereinafter also referred to merely as a "pigment water dispersion"); and Step III; mixing the water dispersion obtained in the step II with a crosslinking agent to subject the water dispersion to crosslinking treatment, thereby obtaining a water dispersion of the crosslinked pigment-containing polymer particles.

(Step I)

In the step I, there is preferably used the method in which the water-insoluble polymer (BX) is first dissolved in the organic solvent, and then the pigment and water, if required together with a neutralizing agent, a surfactant and the like, are added to and mixed in the resulting organic solvent solution to obtain a dispersion of an oil-in-water type.

The organic solvent in which the water-insoluble polymer (BX) can be dissolved is not particularly limited. When the water-insoluble polymer is synthesized by the solution polymerization method, the solvent used in the polymerization method may be directly used as such in the step I.

In the case where the water-insoluble polymer (BX) is an anionic polymer, an anionic group contained in the water-insoluble polymer may be neutralized using a neutralizing agent. Examples of the neutralizing agent include hydroxides of alkali metals, ammonia, organic amines and the like.

The method of conducting the dispersion treatment in the step I is not particularly limited. However, it is preferred that the pigment mixture is first subjected to preliminary dispersion treatment, and then to substantial dispersion treatment by applying a shear stress thereto so as to control the average particle size of the obtained pigment particles to a desired value. Examples of the disperser used in the preliminary dispersion treatment include ordinary mixing and stirring devices such as anchor blades, disper blades and the like. Of these devices, preferred are high-speed stirring mixers.

In addition, examples of the disperser used in the substantial dispersion treatment include kneading machines such as roll mills, kneaders, etc., high-pressure homogenizers such as "MICROFLUIDIZER" available from Microfluidics Corporation, etc., and media-type dispersers such as paint shakers, beads mills, etc. Among these devices, from the viewpoint of reducing a particle size of the pigment, the high-pressure homogenizers are preferably used. In the case where the substantial dispersion treatment is conducted using the high-pressure homogenizer, the particle size of the pigment can be adjusted to a desired value by suitably controlling the treating pressure and the number of passes through the homogenizer.

(Step II)

In the step II, the organic solvent is removed from the dispersion obtained in the step I by any conventionally known methods to obtain the pigment water dispersion. The organic solvent is preferably substantially completely removed from the thus obtained pigment water dispersion. However, some amount of the residual organic solvent may be present in the pigment water dispersion unless the objects and advantageous effects of the present invention are adversely affected by the residual organic solvent.

In the thus obtained pigment water dispersion, the water-insoluble polymer (BX) in the form of solids containing the pigment is dispersed in a medium containing water as a main medium. The configuration of the pigment-containing polymer particles in the pigment water dispersion is not particularly limited, and the pigment-enclosing configuration in which the pigment is enclosed in the polymer is preferred as described previously.

(Step III)

The step III is an optional step. The step III is preferably carried out from the viewpoint of improving storage stability of the pigment water dispersion and the resulting ink.

In the case where the water-insoluble polymer (BX) is an anionic water-insoluble polymer containing an anionic group, the crosslinking agent used in the step III is preferably in the form of a compound containing a functional group that is capable of reacting with the anionic group of the polymer, more preferably a compound containing the two or more functional groups in a molecule thereof and even more preferably a compound containing the 2 to 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are compounds containing two or more epoxy groups in a molecule thereof, and more preferred is trimethylolpropane polyglycidyl ether.

The solid content of the resulting pigment water dispersion is preferably not less than 10% by mass and more preferably not less than 15% by mass, and is also preferably not more than 35% by mass and more preferably not more than 30% by mass, from the viewpoint of improving dispersion stability of the pigment water dispersion, etc. Meanwhile, the solid content of the pigment water dispersion may be measured by the method described in Examples below.

The average particle size of the pigment-containing polymer particles in the pigment water dispersion is preferably not less than 40 nm, more preferably not less than 60 nm, even more preferably not less than 80 nm and further even more preferably not less than 85 nm, and is also preferably not more than 150 nm, more preferably not more than 130 nm and even more preferably not more than 125 nm, from the viewpoints of suppressing formation of coarse particles and improving continuous ejection properties of the resulting ink.

Meanwhile, the average particle size of the pigment-containing polymer particles may be measured by the method described in Examples below.

<Organic Solvent (C)>

As the organic solvent (C), those organic solvents having a boiling point of not lower than 90° C. and lower than 250° C. are preferred from the viewpoint of obtaining good printed characters or images which are excellent in uniformity of solid image printing and suffer from less intercolor bleeding. The boiling point of the organic solvent (C) is more preferably not lower than 130° C., even more preferably not lower than 140° C. and further even more preferably not lower than 150° C., and is also more preferably not higher than 245° C., even more preferably not higher than 240° C. and further even more preferably not higher than 235° C.

Examples of the suitable organic solvent (C) include at least one compound selected from the group consisting of a polyhydric alcohol (c-1) and a glycol ether (c-2).

(Polyhydric Alcohol (c-1))

Examples of the polyhydric alcohol (c-1) include 1,2-alkanediols such as ethylene glycol, propylene glycol, 1,2-butanediol, 1,2-pentanediol, 1,2-hexanediol, etc.; diethylene glycol, polyethylene glycol, dipropylene glycol, 1,3-propanediol, 1,3-butanediol, 1,4-butanediol, 3-methyl-1,3-butanediol, 1,5-pentanediol, 2-methyl-2,4-pentanediol, 1,2,6-hexanetriol, 1,2,4-butanetriol, 1,2,3-butanetriol, petriol, etc.; and the like.

Among these polyhydric alcohols, from the viewpoint of improving storage stability and continuous ejection properties of the resulting ink, preferred is at least one compound selected from the group consisting of alkanediols having not less than 2 and not more than 6 carbon atoms, such as propylene glycol (boiling point (b.p.): 188° C.), diethylene glycol (b.p.: 245° C.), 1,2-hexanediol (b.p.: 223° C.), etc., and polypropylene glycols having a molecular weight of 500 to 1000, and more preferred is at least one compound selected from the group consisting of 1,2-alkanediols having not less than 3 and not more than 4 carbon atoms, such as propylene glycol, diethylene glycol, etc., and the aforementioned polypropylene glycols.

(Glycol Ether (c-2))

Specific examples of the glycol ether (c-2) include at least one compound selected from the group consisting of alkylene glycol monoalkyl ethers, alkylene glycol dialkyl ethers and the like. Among these glycol ethers, from the viewpoint of improving continuous ejection properties of the resulting ink as well as from the viewpoint of obtaining good printed characters or images which are excellent in uniformity of solid image printing and suffer from less intercolor bleeding, preferred are alkylene glycol monoalkyl ethers. The number of carbon atoms in an alkyl group of the alkylene glycol monoalkyl ethers is preferably not less than 1, more preferably not less than 2 and even more preferably not less than 3, and is also preferably not more than 6 and more preferably not more than 4. The alkyl group of the alkylene glycol monoalkyl ethers may be in the form of either a straight chain or a branched chain.

Specific examples of the alkylene glycol monoalkyl ethers include at least one compound selected from the group consisting of ethylene glycol ethyl ether, ethylene glycol isopropyl ether, ethylene glycol propyl ether, ethylene glycol butyl ether, diethylene glycol methyl ether, diethylene glycol ethyl ether, diethylene glycol isopropyl ether, diethylene glycol isobutyl ether, diethylene glycol butyl ether, triethylene glycol methyl ether, dipropylene glycol butyl ether, dipropylene glycol methyl ether, tripropylene glycol methyl ether and the like.

Of these alkylene glycol monoalkyl ethers, preferred is at least one compound selected from the group consisting of ethylene glycol isopropyl ether (b.p.: 144° C.), ethylene glycol propyl ether (b.p.: 151° C.), diethylene glycol methyl ether (b.p.: 194° C.), diethylene glycol isopropyl ether (b.p.: 207° C.), diethylene glycol isobutyl ether (b.p.: 230° C.) and diethylene glycol butyl ether (b.p.: 230° C.), and more preferred is at least one compound selected from the group consisting of ethylene glycol isopropyl ether, diethylene glycol isopropyl ether and diethylene glycol isobutyl ether.

(Other Organic Solvents)

In the present invention, the water-based ink may also contain, in addition to the aforementioned organic solvent (C), those organic solvents that may be usually compounded in the water-based ink, such as the other alcohols, alkyl ethers of the alcohols, glycol ethers, nitrogen-containing heterocyclic compounds such as NMP, etc., amides, amines, sulfur-containing compounds and the like.

For example, 1,6-hexanediol (b.p.: 250° C.), triethylene glycol (b.p.: 285° C.), tripropylene glycol (b.p.: 273° C.), polypropylene glycol (b.p.: not lower than 250° C.), glycerin (b.p.: 290° C.), etc., may be used in combination with the aforementioned organic solvents having a boiling point of lower than 250° C.

<Surfactant (D)>

The water-based ink used in the present invention preferably further contain a surfactant (D) from the viewpoint of obtaining good printed characters or images which are excellent in uniformity of solid image printing and suffer from less intercolor bleeding. As the surfactant (D), there are preferably used those surfactants including a silicone-based surfactant (d-1).

As the silicone-based surfactant (d-1), any suitable silicone-based surfactants may be appropriately selected and used according to the aimed objects and applications of the water-based ink. Among these silicone-based surfactants, from the viewpoint of suppressing increase in viscosity of the resulting ink and improving continuous ejection properties of the ink as well as from the viewpoint of obtaining good printed characters or images which are excellent in uniformity of solid image printing and suffer from less intercolor bleeding, a polyether-modified silicone-based surfactant is preferably used.

(Polyether-Modified Silicone-Based Surfactant)

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (P0) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, and the like.

The HLB value of the polyether-modified silicone-based surfactant is preferably not less than 3.0, more preferably not less than 4.0 and even more preferably not less than 4.5 from the viewpoint of improving solubility of the polyether-modified silicone-based surfactant in the water-based ink. The term "HLB" as used herein means the value indicating an affinity of the surfactant to water and an oil, and can be calculated according to the following formula by Griffin method. Meanwhile, as the "hydrophilic group contained in surfactant" shown in the following formula, there may be mentioned, for example, a hydroxy group and an ethyleneoxy group.

$$HLB=20\times[(\text{molecular weight of hydrophilic group contained in surfactant})/(\text{molecular weight of surfactant})]$$

Specific examples of the polyether-modified silicone-based surfactant include "KF" series products available from Shin-Etsu Chemical Co., Ltd., "SILFACE SAG" available from Nissin Chemical Co., Ltd., "BYK" series products available from BYK Chemie Japan K.K., and the like.

(Other Surfactants)

In the present invention, the polyether-modified silicone-based surfactant may be used in combination with the other surfactants. Among the surfactants other than the polyether-modified silicone-based surfactant, preferred is a nonionic surfactant.

Examples of the nonionic surfactant include (1) alkyl ethers and alkenyl ethers of polyoxyalkylenes which are produced by adding an alkyleneoxide to an aliphatic or aromatic alcohol having 8 to 22 carbon atoms or a polyhydric alcohol, (2) esters of an alcohol containing a hydrocarbon group having 8 to 22 carbon atoms, and a polyvalent fatty acid, (3) polyoxyalkylene aliphatic amines containing an alkyl group or alkenyl group having 8 to 20 carbon atoms, (4) ester compounds of a higher fatty acid having 8 to 22 carbon atoms and a polyhydric alcohol, or compounds produced by adding an alkyleneoxide to the ester compounds, (5) compounds formed by adding an alkyleneoxide to an acetylene glycol, and the like. Among these compounds, preferred are the compounds formed by adding an alkyleneoxide to an acetylene glycol.

Examples of commercially available products of the nonionic surfactant include "SURFYNOL" series products available from Nissin Chemical Co., Ltd., and "ACETYLENOL" series products available from Kawaken Fine Chemicals Co., Ltd., as the compounds formed by adding an alkyleneoxide to an acetylene glycol, and "EMULGEN 120" (polyoxyethylene lauryl ether) available from Kao Corporation as the alkyl ether of polyoxyalkylene formed by adding an alkyleneoxide to an aliphatic alcohol, and the like.

[Contents of Respective Components in Water-Based Ink and Properties of Water-Based Ink]

The water-based ink used in the present invention may be obtained by appropriately mixing the aforementioned components and then stirring the resulting mixture. The contents of the respective components in the resulting water-based ink as well as various properties of the water-based ink are as follows.

(Content of Colorant (A))

The content of the colorant (A) in the first ink (chromatic inks and/or black ink) is preferably not less than 2% by mass, more preferably not less than 4% by mass and even more preferably not less than 6% by mass from the viewpoint of enhancing optical density of the water-based ink upon printing. Also, the content of the colorant (A) in the first ink is preferably not more than 30% by mass, more preferably not more than 20% by mass, even more preferably not more than 15% by mass and further even more preferably not more than 10% by mass from the viewpoint of reducing the viscosity of the water-based ink upon volatilization of the solvent therefrom and improving continuous ejection properties of the water-based ink as well as from the viewpoint of obtaining good printed characters or images which are excellent in uniformity of solid image printing and suffer from less intercolor bleeding.

The content of the colorant (A) in the second ink (ink for a background image) is preferably not less than 4% by mass, more preferably not less than 6% by mass and even more preferably not less than 8% by mass, and is also preferably not more than 40% by mass, more preferably not more than 30% by mass, even more preferably not more than 20% by mass and further even more preferably not more than 15% by mass from the viewpoint of enhancing uniformity of solid image printing on a printed surface superimposed on an image 1 that has been formed by ejecting the first ink onto a printing medium to thereby obtain good printed characters or images which suffer from less intercolor bleeding.

(Content of Polymer (B))

The content of the polymer (B) in the water-based ink is preferably not less than 1% by mass, more preferably not less than 2% by mass and even more preferably not less than 3% by mass, and is also preferably not more than 20% by mass, more preferably not more than 13% by mass and even more preferably not more than 8% by mass, from the viewpoint of improving fixing properties of the resulting water-based ink.

In the case where the polymer (B) is used as the pigment dispersing polymer (B-1), the content of the pigment dispersing polymer (B-1) in the water-based ink is preferably not less than 0.01% by mass, more preferably not less than 0.05% by mass and even more preferably not less than 0.1% by mass, and is also preferably not more than 10% by mass, more preferably not more than 7% by mass and even more preferably not more than 5% by mass, from the viewpoint of improving fixing properties of the resulting water-based ink.

In the case where the polymer (B) is used as the fixing aid polymer (B-2), the content of the fixing aid polymer (B-2) in the water-based ink is preferably not less than 0.9% by mass, more preferably not less than 1% by mass and even more preferably not less than 1.2% by mass, and is also preferably not more than 10% by mass, more preferably not more than 6% by mass and even more preferably not more than 3% by mass, from the viewpoint of improving fixing properties of the resulting water-based ink.

Meanwhile, when using the pigment-containing water-insoluble polymer (BX) particles, the content of the polymer (B) in the water-based ink as described herein means a total content of the pigment dispersing polymer (B-1) of the pigment-containing polymer particles and the fixing aid polymer (B-2).

(Content of Organic Solvent (C))

The content of the organic solvent (C) in the water-based ink is preferably not less than 15% by mass, more preferably not less than 20% by mass and even more preferably not less than 25% by mass, and is also preferably not more than 45% by mass, more preferably not more than 40% by mass and even more preferably not more than 35% by mass, from the viewpoint of improving continuous ejection properties of the resulting water-based ink.

The content of the polyhydric alcohol (c-1) in the water-based ink is preferably not less than 10% by mass, more preferably not less than 15% by mass and even more preferably not less than 20% by mass, and is also preferably not more than 45% by mass, more preferably not more than 40% by mass and even more preferably not more than 35% by mass, from the viewpoint of improving storage stability and continuous ejection properties of the resulting water-based ink.

The content of the glycol ether (c-2) in the water-based ink is preferably not less than 1% by mass, more preferably not less than 2% by mass and even more preferably not less than 3% by mass, and is also preferably not more than 15% by mass, more preferably not more than 12% by mass and even more preferably not more than 8% by mass, from the viewpoint of improving storage stability and continuous ejection properties of the resulting water-based ink.

The content of a high-boiling point organic solvent having a boiling point of not lower than 250° C. in the water-based ink used in the present invention is preferably not more than 5% by mass, more preferably not more than 4% by mass and even more preferably not more than 3% by mass from the viewpoint of imparting adequate drying properties to the water-based ink upon high-speed printing and preventing occurrence of mottling or color bleeding.

(Content of Surfactant (D))

The content of the surfactant (D) in the water-based ink is preferably not less than 0.1% by mass, more preferably not less than 0.2% by mass and even more preferably not less than 0.5% by mass, and is also preferably not more than 5% by mass, more preferably not more than 4% by mass, even more preferably not more than 3% by mass and further even more preferably not more than 2.5% by mass, from the viewpoint of suppressing increase in viscosity of the water-based ink and improving continuous ejection properties of the water-based ink as well as from the viewpoint of obtaining good printed characters or images which are excellent in uniformity of solid image printing and suffer from less intercolor bleeding.

The content of the silicone-based surfactant (d-1) in the water-based ink is preferably not less than 0.005% by mass, more preferably not less than 0.03% by mass and even more preferably not less than 0.04% by mass, and is also preferably not more than 0.5% by mass, more preferably not more than 0.4% by mass and even more preferably not more than 0.3% by mass, from the same viewpoint as described above.

The content of the polyether-modified silicone-based surfactant in the water-based ink is preferably not less than 0.01% by mass, more preferably not less than 0.02% by mass and even more preferably not less than 0.03% by mass, and is also preferably not more than 0.5% by mass, more preferably not more than 0.4% by mass and even more preferably not more than 0.2% by mass, from the same viewpoint as described above.

The content of the nonionic surfactant (d-2) in the water-based ink is preferably not less than 0.1% by mass, more preferably not less than 0.8% by mass and even more preferably not less than 1.5% by mass, and is also preferably not more than 5% by mass, more preferably not more than 3.5% by mass and even more preferably not more than 2.5% by mass, from the same viewpoint as described above.

(Content of Water)

The content of water in the water-based ink is preferably not less than 20% by mass, more preferably not less than 30% by mass and even more preferably not less than 40% by mass, and is also preferably not more than 85% by mass, more preferably not more than 80% by mass and even more preferably not more than 75% by mass, from the viewpoint of improving continuous ejection properties and storage stability of the water-based ink as well as from the viewpoint of obtaining good printed characters or images which are excellent in uniformity of solid image printing and suffer from less intercolor bleeding.

The water-based ink used in the present invention may also contain, in addition to the aforementioned components, various ordinary additives that may be usually used in water-based inks, such as a humectant, a wetting agent, a penetrant, a defoaming agent, an antiseptic agent, a mildew-proof agent, a rust preventive and the like.

The water-based ink used in the present invention preferably contains no radical-polymerizable compound from the viewpoint of improving safety and reducing occurrence of unpleasant smell when printing characters or images on food packages, etc.

<Properties of Water-Based Ink>

From the viewpoint of obtaining good printed characters or images which are excellent in uniformity of solid image printing and suffer from less intercolor bleeding, the static surface tension of each of the first ink (chromatic inks and/or black ink) and the second ink (ink for a background image) used in the printing method of the present invention as measured at 20° C. is preferably not less than 22 mN/m, more preferably not less than 24 mN/m and even more preferably not less than 25 mN/m, and is also preferably not more than 45 mN/m, more preferably not more than 40 mN/m and even more preferably not more than 35 mN/m.

The viscosity of each of the first ink and the second ink as measured at 32° C. is preferably not less than 2 mPa·s, more preferably not less than 3 mPa·s and even more preferably not less than 4 mPa·s, and is also preferably not more than 20 mPa·s, more preferably not more than 18 mPa·s and even more preferably not more than 16 mPa·s, from the viewpoint of improving continuous ejection properties of the respective inks.

Furthermore, the viscosity of the second ink as measured at 32° C. is preferably not less than 7 mPa·s, more preferably not less than 8 mPa·s and even more preferably not less than 9 mPa·s, and is also preferably not more than 25 mPa·s, more preferably not more than 23 mPa·s, even more preferably not more than 21 mPa·s and further even more preferably not more than 18 mPa·s, from the viewpoint of obtaining good printed characters or images which are excellent in uniformity of solid image printing and suffer from less intercolor bleeding.

In addition, the static surface tension and the viscosity of the first ink and the static surface tension and the viscosity of the second ink satisfy the relationship represented by the following formulae (1) and (2):

$$[T_2-T_1]<0 \text{ mN/m} \quad (1); \text{ and}$$

$$[V_2-V_1]\geq 1.0 \text{ mPa·s} \quad (2),$$

wherein $T_2$ is the static surface tension of the second ink; $T_1$ is the static surface tension of the first ink; $V_2$ is the viscosity of the second ink as measured at 32° C.; and $V_1$ is the viscosity of the first ink as measured at 32° C.

It is considered that when the static surface tension of the first ink and the static surface tension of the second ink satisfy the aforementioned formula (1), expansion of the dots formed by droplets of the second ink subsequently ejected on the dots formed by droplets of the first ink previously ejected and impacted onto a low-liquid absorbing printing medium can be promoted.

From the viewpoint of obtaining good printed characters or images which are excellent in uniformity of solid image printing and suffer from less intercolor bleeding, the static surface tension of the respective water-based inks is controlled such that $[T_2-T_1]$ is preferably not more than −0.3 mN/m, more preferably not more than −1 mN/m, even more preferably not more than −1.5 mN/m, further even more preferably not more than −1.8 mN/m and still further even more preferably not more than −2 mN/m. In addition, from the viewpoint of well setting printing conditions, the static surface tension of the respective water-based inks is controlled such that $[T_2-T_1]$ is preferably not less than −6 mN/m.

The static surface tension of the respective inks may be well controlled, for example, by appropriately selecting the kind and content of the organic solvent (C) or the surfactant (D). The static surface tension of the respective inks is the value as measured at 20° C.

It is considered that when the viscosity of the first ink and the viscosity of the second ink satisfy the aforementioned formula (2), the velocity of expansion of droplets of the second ink impacted on the low-liquid absorbing printing medium is suppressed to adequately control the balance between the static surface tension and viscosity of the respective inks, so that it is possible to obtain good printed characters or images which suffer from less intercolor bleeding.

From the same viewpoint as described above, the viscosity of the respective water-based inks as measured at 32° C. is controlled such that $[V_2-V_1]$ is preferably not less than 2 mPa·s, more preferably not less than 4 mPa·s, even more preferably not less than 5 mPa·s and further even more preferably not less than 6 mPa·s. In addition, from the viewpoint of well setting printing conditions, the viscosity of the respective water-based inks as measured at 32° C. is controlled such that $[V_2-V_1]$ is preferably not more than 30 mPa·s.

The viscosity of the respective inks may be well controlled, for example, by appropriately selecting the kind and content of the fixing aid polymer (B-2), the organic solvent (C) or the surfactant (D).

The average particle size of the particles contained in the water-based ink in the case where the water-based ink is the first ink (image-forming ink; chromatic inks and/or black ink) is preferably not less than 40 nm, more preferably not less than 60 nm and even more preferably not less than 80 nm, and is also preferably not more than 250 nm, more preferably not more than 220 nm, even more preferably not more than 200 nm and further even more preferably not more than 180 nm, from the viewpoint of improving storage stability and ejection properties of the water-based ink.

The average particle size of the particles contained in the second ink (ink for a background image) is preferably not less than 100 nm, more preferably not less than 150 nm and even more preferably not less than 200 nm, and is also preferably not more than 400 nm, more preferably not more than 350 nm, even more preferably not more than 300 nm and further even more preferably not more than 280 nm, from the viewpoint of well covering the image 1 formed by the first ink, with the second ink.

The pH value of the respective water-based inks is preferably not less than 7.0, more preferably not less than 8.0, even more preferably not less than 8.5 and further even more preferably not less than 8.7 from the viewpoint of improving storage stability, etc., of the water-based inks as well as from the viewpoint of obtaining good printed characters or images which are excellent in uniformity of solid image printing and suffer from less intercolor bleeding, and is also preferably not more than 11.0 and more preferably not more than 10.0 from the viewpoint of improving resistance of members to the water-based inks and suppressing skin irritation.

<Ink-Jet Printing Method>

In the ink-jet printing method of the present invention, after printing characters or images with the at least one first ink on a low-liquid absorbing printing medium, a background image is printed with the second ink so as to superimpose the background image on at least a part of the characters or images printed by the first ink. It is preferred that the at least first ink (image-forming ink) selected from the group consisting of chromatic inks and a black ink is ejected onto the low-liquid absorbing printing medium to form an image 1 thereon, and then the second ink (ink for the background image) is ejected thereonto to print the background image. From the viewpoint of obtaining good printed characters or images which are excellent in uniformity of solid image printing and suffer from less intercolor bleeding, it is more preferred that the image 1 is covered with the background image such that the background image is superimposed on at least a part of the image 1. The ink for the background image is preferably a white ink.

Furthermore, in order to prevent occurrence of color bleeding between the inks, there may be provided a fixing and curing means, if required. Examples of the fixing and curing means include an apparatus for applying a heat energy, such as a heater, etc., a hot air fan, and the like. Moreover, if the resulting printed material is heated and dried by an infrared heater, etc., from the side of the surface of the printed material on which the background image has been formed, it is possible to heat and dry the printed surface on which the background image is formed, for a short period time with high productivity.

(Low-Liquid Absorbing Printing Medium)

Examples of the low-liquid absorbing printing medium used in the present invention include a low-liquid absorbing coated paper and a resin film. From the viewpoint of efficiently conducting reverse printing, the low-liquid absorbing printing medium is preferably a transparent printing medium. The low-liquid absorbing printing medium may be in the form of either a sheet-like medium or a rolled-up medium. However, from the viewpoint of enhancing productivity of printed materials, the rolled-up printing medium is preferably used. As the low-liquid absorbing printing medium used in the present invention, preferred is such a printing medium that is not subjected to any pretreatments such as application of a treating solution thereonto, etc.

Examples of the coated paper include a versatile glossy coated paper "OK Topcoat Plus" (water absorption as measured in a water contact time of 100 milliseconds (hereinafter defined in the same way): 4.9 g/m$^2$) available from Oji Paper Co., Ltd., a multi-color foam glossy coated paper (water absorption: 5.2 g/m$^2$) available from Oji Paper Co., Ltd., "UPM Finesse Gloss" (water absorption: 3.1 g/m$^2$) available from UPM, and the like.

As the resin film, there may be used a transparent synthetic resin film having good transparency. Examples of the transparent synthetic resin film include a polyester film, a polyvinyl chloride film, a polypropylene film, a polyethylene film, a nylon film and the like. These resin films may be in the form of either a biaxially oriented film, a monoaxially oriented film or a non-oriented film. Among these films, preferred are a polyester film and an oriented polypropylene film, and more preferred are a polyester film such as a polyethylene terephthalate (PET) film subjected to corona discharge treatment, etc., and an oriented polypropylene film such as a biaxially oriented polypropylene (OPP) film subjected to corona discharge treatment, etc.

The thickness of the resin film is not particularly limited, and the resin film may be in the form of a thin film having a thickness of not less than 1 μm and less than 20 μm. However, the thickness of the resin film is preferably not less than 20 μm, more preferably not less than 30 μm and even more preferably not less than 35 μm, and is also preferably not more than 100 μm, more preferably not more than 80 μm and even more preferably not more than 75 μm, from the viewpoint of suppressing deterioration in appearance of the printing medium and improving availability of the printing medium.

Examples of commercially available products of the transparent synthetic resin film include "LUMIRROR T60" (PET) available from Toray Industries, Inc., "TAIKO FE2001" (corona discharge-treated PET) available from Futamura Chemical Co, Ltd., "TAIKO FOR-AQ" (corona discharge-treated OPP) available from Futamura Chemical Co, Ltd., "PVC80B P" (polyvinyl chloride) available from Lintec Corporation, "KINATH KEE 70CA" (polyethylene) available from Lintec Corporation, "YUPO SG90 PAT1" (PP) available from Lintec Corporation, "BONYL RX" (nylon) available from Kohjin Film & Chemicals Co., Ltd., and the like.

(Printing Method)

In the present invention, there may be used any of a serial-type print head and a line-type print head. Of these print heads, the line-type print head is preferably used in the present invention. In the printing method using the line-type print head, while maintaining the print head in a stationery state and moving the printing medium along a transportation direction thereof, droplets of the ink are ejected from openings of nozzles of the print head in association with the movement of the printing medium, whereby it is possible to allow the ink droplets to adhere onto the printing medium to print characters or images, etc., thereon by a single-pass (one-pass) method.

The ink droplets are preferably ejected by a piezoelectric method. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method for ejecting the ink droplets.

The voltage applied to the print head is preferably not less than 5 V, more preferably not less than 10 V and even more preferably not less than 15 V, and is also preferably not more than 40 V, more preferably not more than 35 V and even more preferably not more than 30 V, from the viewpoint of conducting the high-speed printing with high efficiency, etc.

The drive frequency of the print head is preferably not less than 2 kHz, more preferably not less than 5 kHz and even more preferably not less than 8 kHz, and is also preferably not more than 80 kHz, more preferably not more than 70 kHz and even more preferably not more than 60 kHz, from the viewpoint of conducting the high-speed printing with high efficiency, etc.

(Printing Conditions, etc.)

The amount of the ink droplets ejected is preferably not less than 0.5 pL, more preferably not less than 1.0 pL, even more preferably not less than 1.5 pL and further even more preferably not less than 1.8 pL, and is also preferably not more than 20 pL, more preferably not more than 15 pL and even more preferably not more than 13 pL, as calculated per one ink droplet ejected, from the viewpoint of maintaining accuracy of impact positions of the ink droplets and improving quality of printed characters or images.

The print head resolution is preferably not less than 400 dpi (dot/inch), more preferably not less than 500 dpi and even more preferably not less than 550 dpi.

From the viewpoint of reducing viscosity of the water-based ink and improving continuous ejection properties of the water-based ink, the inside temperature of the print head, preferably a line-type print head, upon the printing, is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The printing speed is usually not less than 5 m/min, preferably not less than 10 m/min, more preferably not less than 20 m/min and even more preferably not less than 30 m/min in terms of a transportation speed of the printing medium in the direction along which the printing medium is moved upon the printing, from the viewpoint of enhancing productivity of printed materials, and is also preferably not more than 75 m/min in terms of a transportation speed of the printing medium from the viewpoint of improving operability of the printing apparatus.

The amount of the water-based ink deposited on the printing medium is preferably not less than 0.1 g/m$^2$, and is also preferably not more than 25 g/m$^2$ and more preferably not more than 20 g/m$^2$, in terms of a solid content thereof, from the viewpoint of improving quality of the printed characters or images and increasing the printing speed.

The ink-jet printing method of the present invention preferably further includes the step of drying droplets of the ink impacted and deposited on a treated surface of the surface-treated low-liquid absorbing substrate after printing the characters or images by ejecting the ink droplets onto the treated surface by an ink-jet printing method, from the viewpoint of obtaining good printed characters or images which are excellent in uniformity of solid image printing and suffer from less intercolor bleeding.

The temperature of the surface of the printing medium in the drying step is preferably not lower than 30° C., more preferably not lower than 40° C. and even more preferably not lower than 50° C. from the viewpoint of obtaining good printed characters or images which are excellent in uniformity of solid image printing and suffer from less intercolor bleeding, and is also preferably not higher than 200° C., more preferably not higher than 150° C., even more preferably not higher than 120° C. and further even more preferably not higher than 90° C. from the viewpoint of suppressing deformation of the printing substrate owing to heat applied thereto and saving energy consumed.

The drying time of the ink droplets on the printing substrate in the drying step is preferably not less than 3 minutes and more preferably not less than 5 minutes from the viewpoint of obtaining good printed characters or images which are excellent in uniformity of solid image printing and suffer from less intercolor bleeding, and is also preferably not more than 30 minutes and more preferably not more than 15 minutes from the viewpoint of suppressing deformation of the printing substrate owing to heat applied thereto and saving energy consumed.

In addition, from the viewpoint of promoting drying of the ink on the printing medium, the printing may be conducted while heating the printing medium by a heater, etc.

<Ink Set>

The ink set of the present invention contains the at least one first ink and the second ink, in which the first ink is an ink for forming characters or images, and the second ink is an ink for forming a background image;

the first ink and the second ink are respectively in the form of a water-based ink containing the colorant (A), the polymer (B), the organic solvent (C) and water; and the static surface tension and the viscosity of the first ink and the static surface tension and the viscosity of the second ink satisfy the relationship represented by the following formulae (1) and (2):

$$[T_2-T_1]<0 \text{ mN/m} \quad (1); \text{ and}$$

$$[V_2-V_1]\geq 1.0 \text{ mPa·s} \quad (2),$$

wherein $V_2$ is the viscosity of the second ink as measured at 32° C.; $V_1$ is the viscosity of the first ink as measured at 32° C.; $T_2$ is the static surface tension of the second ink; and $T_1$ is the static surface tension of the first ink.

The first ink preferably contains at least one pigment selected from the group consisting of chromatic pigments and a black pigment, the polymer, the organic solvent and water, and the second ink preferably contains a white pigment, the polymer, the organic solvent and water.

The ink set of the present invention can be suitably used for reverse printing using a transparent printing medium.

EXAMPLES

In the following Synthesis Examples, Production Examples, Examples and Comparative Examples, the "part(s)" and "%" indicate "part(s) by mass" and "% by mass", respectively, unless otherwise specified. Meanwhile, the methods of measuring respective properties and characteristics, etc., are as follows.

In the Examples, etc., from the standpoint of evaluating uniformity of solid image printing and intercolor bleeding, there were illustrated the cases where a black ink was used as the first ink (image-forming ink), and a white ink was used as the second ink (ink for a background image). However, the colors of these inks are not particularly limited. For example, even though any of a magenta ink, a yellow ink and a cyan ink is used as the image-forming ink, the same effect of the present invention as that of the black ink can be attained and exhibited.

(1) Measurement of Weight-Average Molecular Weight of Water-Insoluble Polymer

The weight-average molecular weight of the polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using monodisperse polystyrenes having previously known molecular weights as a reference standard substance.

(2) Measurement of Average Particle Sizes of Pigment-Containing Polymer Particles and Polymer Particles in Water Dispersion or Ink The water dispersion or ink was subjected to cumulant analysis using a laser particle analyzing system "ELSZ-1000" available from Otsuka Electrics Co., Ltd. The water dispersion or ink to be measured was diluted with water so as to adjust a concentration of the water dispersion or ink to $5\times10^{-3}\%$ by mass in terms of a solid content thereof. The measurement was conducted under the conditions including a temperature of 25° C., an angle between incident light and detector of 165° and a cumulative number of 100 times, and a refractive index of water (1.333) was input to the analyzing system as a refractive index of the dispersing medium. The thus determined cumulant average particle size was defined as the average particle size of the particles in the water dispersion or ink.

(3) Measurement of Solid Content of Pigment Water Dispersion

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Static Surface Tension of Water-Based Ink

A platinum plate was dipped in 5 g of the water-based ink filled in a cylindrical polyethylene container (3.6 cm in diameter×1.2 cm in depth), and the static surface tension of the water-based ink was measured at 20° C. using a surface tension meter "CBVP-Z" (tradename) available from Kyowa Interface Science Co., Ltd.

(5) Measurement of Viscosity of Water-Based Ink

The viscosity of the water-based ink was measured at 32° C. using an E-type viscometer "TV-25" (equipped with a standard cone rotor (1° 34'×R24); rotating speed: 50 rpm) available from Toki Sangyo Co., Ltd.

(6) Measurement of pH of Water-Based Ink

The pH value of the water-based ink was measured at 25° C. using a bench-top pH meter "F-71" available from Horiba Ltd., equipped with a pH electrode "6337-10D" available from Horiba Ltd.

(7) Water Absorption of Printing Medium as Measured by Contacting Printing Medium with Pure Water for 100 Milliseconds Using an automatic scanning absorptometer "KM500win" available from Kumagai Riki Kogyo Co., Ltd., the amount of pure water transferred to a printing medium when contacting the printing medium with pure water for 100 milliseconds was measured at 23° C. under a relative humidity of 50%.

The thus measured amount of pure water transferred to the printing medium was defined as a water absorption of the printing medium as measured in a pure water contact time of 100 milliseconds. The measuring conditions are shown below.

"Spiral Method"
  Contact time: 0.010 to 1.0 (sec)
  Pitch (mm): 7
  Length Per Sampling (degree): 86.29
  Start Radius (mm): 20 End Radius (mm): 60
  Min Contact Time (ms): 10 Max Contact Time (ms): 1000
  Sampling Pattern (1-50): 50
  Number of Sampling Points (>0): 19
"Square Head"
  Split Span (mm): 1 Split Width (mm): 5

Production Example I-1 (Production of Water Dispersion of Black Pigment-Containing Polymer Particles)

(1) Synthesis of Water-Insoluble Pigment Dispersing Polymer (1)

Sixteen parts of methacrylic acid available from FUJIFILM Wako Pure Chemical Corporation, 44 parts of styrene available from FUJIFILM Wako Pure Chemical Corporation, 30 parts of a styrene macromonomer "AS-6S" (tradename; number-average molecular weight: 6,000; solid content: 50%) available from Toagosei Co., Ltd., and 25 parts of methoxypolyethylene glycol monomethacrylate "BLEMMER PME-200" (tradename; average molar number of addition of ethyleneoxide: n=4) available from NOF Corporation were mixed with each other to prepare 115 parts of a monomer mixture solution.

Eighteen parts of methyl ethyl ketone and 0.03 part of 2-mercaptoethanol as a chain transfer agent as well as 10% (11.5 parts) of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% (103.5 parts) of the monomer mixture solution, 0.27 part of the aforementioned chain transfer agent, 42 parts of methyl ethyl ketone and 3 parts of 2,2'-azobis(2,4-dimethylvaleronitrile) "V-65" (tradename) as a polymerization initiator available from FUJIFILM Wako Pure Chemical Corporation, was charged into a dropping funnel. In a nitrogen atmosphere, the mixed solution in the reaction vessel was heated to 75° C. while stirring, and then the mixed solution in the dropping funnel was added dropwise into the reaction vessel over 3 hours. After the elapse of 2 hours from completion of the dropwise addition while maintaining the resulting mixed solution at 75° C., a solution prepared by dissolving 3 parts of the aforementioned polymerization initiator in 5 parts of methyl ethyl ketone was added to the reaction vessel, and the resulting reaction solution was further aged at 75° C. for 2 hours and then at 80° C. for 2 hours, followed by further adding 50 parts of methyl ethyl ketone thereto, thereby obtaining a solution of a water-insoluble pigment dispersing polymer (1) (having a weight-average molecular weight of 50,000). The solid content of the thus obtained water-insoluble pigment dispersing polymer (1) solution was 45% by mass.

(2) Production of Water Dispersion of Black Pigment-Containing Polymer Particles Added into a solution prepared by dissolving 95.2 parts of the water-insoluble pigment dispersing polymer (1) solution obtained in the above (1) in 53.9 parts of methyl ethyl ketone were 15.0 parts of a 5N sodium hydroxide aqueous solution and 0.5 part of a 25% ammonia aqueous solution both acting as a neutralizing agent as well as 341.3 parts of ion-exchanged water. Furthermore, 100 parts of C.I. Pigment Black 7 (P.B. 7) as a carbon black pigment available from Cabot Corporation were added to the resulting mixture to prepare a pigment mixed solution. The degree of neutralization of the polymer in the thus obtained pigment mixed solution was 78.8 mol %.

The resulting pigment mixed solution was stirred at 20° C. for 60 minutes using a disper "Ultra Disper" (tradename) available from Asada Iron Works Co., Ltd., under the condition of rotating a disper blade thereof at 7000 rpm. The resulting dispersion liquid was subjected to dispersion treatment under a pressure of 180 MPa using a Microfluidizer "High-Pressure Homogenizer M-140K" (tradename) available from Microfluidics Corporation by passing the dispersion liquid through the device 15 times.

The thus obtained dispersion liquid of the pigment-containing polymer particles was maintained at 60° C. under reduced pressure to remove methyl ethyl ketone therefrom, followed by further removing a part of water therefrom. The resulting dispersion was subjected to centrifugal separation, and a liquid layer portion separated therefrom was subjected to filtration treatment through a filter "Minisart Syringe Filter" (tradename; pore size: 5 µm; material: cellulose acetate) available from Sartorius Inc., to remove coarse particles therefrom, thereby obtaining a water dispersion of the pigment-containing polymer particles. The solid content of the thus obtained water dispersion was 25% by mass.

Then, 0.45 part of an epoxy crosslinking agent "DENACOL EX 321L" (tradename; trimethylolpropane polyglycidyl ether; epoxy equivalent: 129) available from Nagase ChemteX Corporation and 15.23 parts of ion-exchanged water were added to 100 parts of the resulting water dispersion of the pigment-containing polymer particles, and the obtained mixture was subjected to heat treatment at 70° C. for 3 hours while stirring (solid content: 22% by mass). After cooling the obtained dispersion to room temperature, a liquid layer portion separated therefrom was subjected to filtration treatment through the aforementioned filter to remove coarse particles therefrom, thereby obtaining a water dispersion of the black pigment-containing polymer particles (solid content: 22.0% by mass). The average particle size of the black pigment-containing polymer particles in the resulting water dispersion was 100 nm.

Production Example I-2 (Production of Water Dispersion of White Pigment-Containing Polymer Particles)

(1) Synthesis of Water-Soluble Acrylic Resin-Based Pigment Dispersing Polymer (2)

A 2 L-capacity glass reaction vessel equipped with dropping funnels was charged with 233.0 parts of water, and water in the flask was heated to 80° C. in a nitrogen atmosphere. Then, a monomer solution containing 135.0 parts of methoxypolyethylene glycol monomethacrylate "NK ESTER M-230G" (tradename; average molar number of addition of ethyleneoxide: n=23) available from Shin-Nakamura Chemical Co., Ltd., and 29.8 parts of methacrylic acid available from FUJIFILM Wako Pure Chemical Corporation as a dropping solution 1, 30.0 parts of a 15%-conc. 2-mercaptoethanol aqueous solution available from TOYOBO Co., Ltd., as a dropping solution 2, and 32.0 parts of a 6%-conc. ammonium persulfate aqueous solution available from FUJIFILM Wako Pure Chemical Corporation as a dropping solution 3, were charged into the respective dropping funnels, and the three dropping solutions were respectively gradually added dropwise at the same time into the reaction vessel over 90 minutes. After completion of the dropwise addition, the resulting mixed solution was aged at 80° C. for 1 hour. Thereafter, the resulting reaction solution was cooed to 40° C., and then 11.6 parts of a 48%-conc. NaOH aqueous solution available from FUJIFILM Wako Pure Chemical Corporation were added thereto to neutralize the solution until a neutralization degree of the polymer therein reached 50%. Then, water was added to the resulting reaction mixture to adjust a solid content thereof to 40%, thereby obtaining a solution of a water-soluble acrylic resin-based pigment dispersing polymer (2).

(2) Production of Water Dispersion of White Pigment-Containing Polymer Particles A 2 L-capacity plastic container was charged with 15.0 g of the neutralized aqueous solution of the water-soluble acrylic resin-based pigment dispersing polymer (2) obtained in the above (1), 300 g of C.I. Pigment White 6 (P.W. 6; "CR80") as titanium oxide available from ISHIHARA SANGYO KAISHA, LTD., and 255 g of water. Then, 1000 g of zirconia beads were added to the container, and the contents of the container were dispersed for 8 hours using a bench top-type pot mill pedestal available from AS ONE Corporation. The resulting dispersion was filtered through a metal mesh to remove the zirconia beads from the resulting dispersion, and then ion-exchanged water was added to the dispersion to adjust a solid content thereof to a predetermined value, thereby obtaining a water dispersion of white pigment-containing polymer particles (solid content: 50.8% by mass).

TABLE 1

|  |  | Production Examples | |
|---|---|---|---|
|  |  | I-1 | I-2 |
| Water dispersion | Color of water dispersion | Black | White |
|  | Kind of pigment used | P.B. 7 | P.W. 6 |
|  | Solid content (%) | 22.0 | 50.8 |
|  | Ratio of pigment introduced (%) | 68.8 | 98.0 |
| Composition of dispersion (part(s)) | Pigment (A) | 15.13 | 49.78 |
|  | Water-insoluble pigment dispersing polymer (1) | 6.48 | — |
|  | Water-soluble pigment dispersing polymer (2) | — | 1.02 |

TABLE 1-continued

|  |  | Production Examples | |
|---|---|---|---|
|  |  | I-1 | I-2 |
|  | Epoxy crosslinking agent "DENACOL EX 321L" | 0.39 | — |
|  | Ion-exchanged water | 78.00 | 49.20 |
|  | Total | 100.00 | 100.00 |
| Properties | Average particle size (nm) | 100 | 310 |
|  | Viscosity at 32° C. (mPa · s) | 4.2 | 3.6 |
|  | pH | 9.9 | 7.5 |

Production Example I-3 (Production of Pigment-Free Fixing Aid Polymer Emulsion P3)

A 1000 mL-capacity separable flask was charged with 145 parts of methyl methacrylate available from FUJIFILM Wako Pure Chemical Corporation, 50 parts of 2-ethylhexyl acrylate available from FUJIFILM Wako Pure Chemical Corporation, 5 parts of methacrylic acid available from FUJIFILM Wako Pure Chemical Corporation, 18.5 parts of an emulsifier "LATEMUL E118B" (tradename; active ingredient content: 26%) available from Kao Corporation, 96 parts of ion-exchanged water and potassium persulfate available from FUJIFILM Wako Pure Chemical Corporation, and the contents of the flask were stirred using a stirring blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with nitrogen gas. In a nitrogen atmosphere, the contents of the reaction vessel were heated to 80° C. while stirring with a stirring blade (200 rpm), and then the aforementioned monomer emulsion was charged into a dropping funnel and added dropwise into the reaction vessel over 3 hours to subject the monomer emulsion to polymerization reaction. The concentration of solid components of the fixing aid polymer particles in the resulting fixing aid polymer emulsion P3 was 41.7% by weight, and the average particle size of the fixing aid polymer particles was 100 nm.

Production Example I-4 (Production of Pigment-Free Fixing Aid Polymer Emulsion P4)

A 1000 mL-capacity separable flask was charged with 134 parts of methyl methacrylate available from FUJIFILM Wako Pure Chemical Corporation, 50 parts of 2-ethylhexyl acrylate available from FUJIFILM Wako Pure Chemical Corporation, 16 parts of methacrylic acid available from FUJIFILM Wako Pure Chemical Corporation, 18.5 parts of an emulsifier "LATEMUL E118B" (tradename; active ingredient content: 26%) available from Kao Corporation, 96 parts of ion-exchanged water and potassium persulfate available from FUJIFILM Wako Pure Chemical Corporation, and the contents of the flask were stirred using a stirring blade (300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with nitrogen gas. In a nitrogen atmosphere, the contents of the reaction vessel were heated to 80° C. while stirring with a stirring blade (200 rpm), and then the aforementioned monomer emulsion was charged into a dropping funnel and added dropwise into the reaction vessel over 3 hours to subject the monomer emulsion to polymerization reaction. The concentration of solid components of the fixing aid polymer particles in the resulting fixing aid polymer emulsion P4 was 41.7% by weight, and the average particle size of the fixing aid polymer particles was 110 nm.

Production Example II-1 (Production of Black Water-Based Ink)

A mixed solution was prepared by mixing 508.9 g of the water dispersion of the black pigment-containing polymer particles (solid content: 22.0% by mass) obtained in Production Example I-1, 48.3 g of the fixing aid polymer emulsion P3 (solid content: 41.7% by weight) obtained in Production Example I-3, 286.0 g of propylene glycol, 44.0 g of diethylene glycol monoisobutyl ether (iBDG), 5.5 g of a silicone-based surfactant "KF-6011" (tradename) available from Shin-Etsu Chemical Co., Ltd., 7.7 g of an acetylene-based nonionic surfactant "SURFYNOL 440" (tradename) available from Nissin Chemical Co., Ltd., and 199.6 g of ion-exchanged water with each other. The resulting mixed solution was subjected to filtration treatment by passing through a filter "Minisart Syringe Filter" (tradename; pore size: 5 μm; material: cellulose acetate) available from Sartorius Inc., thereby obtaining a black water-based ink. The results are shown in Table 2.

Production Example II-2 (Production of Black Water-Based Ink)

The same procedure as in Production Example II-1 was repeated using the water dispersion of the black pigment-containing polymer particles (solid content: 22.0% by mass) obtained in Production Example I-1 except that the composition of the water-based ink was changed to that shown in Table 2, thereby obtaining a black water-based ink. The results are shown in Table 2.

Production Examples II-3 to II-9 (Production of White Water-Based Inks)

The same procedure as in Production Example II-1 was repeated using the water dispersion of the white pigment-containing polymer particles (solid content: 50.8% by mass) obtained in Production Example I-2 except that the composition of the water-based ink was changed to those shown in Table 2, thereby obtaining respective white water-based inks. The results are shown in Table 2.

TABLE 2

| | | | Production Examples | | | | | | | | |
|---|---|---|---|---|---|---|---|---|---|---|---|
| | | | II-1 | II-2 | II-3 | II-4 | II-5 | II-6 | II-7 | II-8 | II-9 |
| Kind of water-based ink | | | Bk-1 | Bk-2 | W-1 | W-2 | W-3 | W-4 | W-5 | W-6 | W-7 |
| Color of water-based ink | | | Black | Black | White | White | White | White | White | White | White |
| Composition of water-based ink (part(s) by mass) | Black pigment water dispersion | part(s) by mass | 508.9 | 508.9 | — | — | — | — | — | — | — |
| | White pigment water dispersion | part(s) by mass | — | — | 331.4 | 441.9 | 331.4 | 441.9 | 441.9 | 221.0 | 441.9 |
| | Fixing aid polymer emulsion P3 | part(s) by mass | 48.3 | 48.3 | 132.0 | 132.0 | 132.0 | 132.0 | 94.8 | 79.5 | 132.0 |
| | Fixing aid polymer emulsion P4 | part(s) by mass | — | — | — | — | — | — | 0.2 | — | — |
| | Propylene glycol | part(s) by mass | 286.0 | 264.0 | 330.0 | 330.0 | 385.0 | 385.0 | 330.0 | 385.0 | 330.0 |
| | iBDG | part(s) by mass | 44.0 | 66.0 | 33.0 | 33.0 | 33.0 | 33.0 | 33.0 | 33.0 | 33.0 |
| | Silicone-based surfactant | part(s) by mass | 5.5 | 7.7 | 11.0 | 11.0 | 11.0 | 11.0 | 11.0 | 11.0 | 3.3 |
| | Acetylene-based nonionic surfactant | part(s) by mass | 7.7 | 7.7 | 11.0 | 11.0 | 11.0 | 11.0 | 11.0 | 11.0 | 3.3 |
| | 1N NaOH aqueous solution | part(s) by mass | 0.0 | 0.0 | 24.4 | 24.4 | 24.4 | 24.4 | 39.1 | 16.3 | 24.4 |
| | Ion-exchanged water | part(s) by mass | 199.6 | 197.4 | 227.2 | 116.7 | 172.2 | 61.7 | 139.1 | 343.3 | 132.1 |
| Content of pigment in ink | | % by mass | 7.0 | 7.0 | 15.0 | 20.0 | 15.0 | 20.0 | 20.0 | 10.0 | 20.0 |
| Content of polymer in ink | | % by mass | 5.0 | 5.0 | 5.3 | 5.4 | 5.3 | 5.4 | 4.0 | 3.2 | 5.4 |
| Properties | Average particle size | nm | 101.0 | 103.1 | 330.0 | 380.0 | 315.0 | 344.0 | 408.0 | 366.1 | 355.1 |
| | Static surface tension | mN/m | 28.8 | 26.9 | 26.1 | 26.5 | 26.6 | 26.4 | 26.1 | 26.6 | 29.1 |
| | Viscosity at 32° C. | mPa·s | 5.5 | 5.8 | 9.8 | 12.2 | 12.2 | 15.1 | 20.1 | 5.1 | 11.1 |
| | pH | — | 9.2 | 9.1 | 8.8 | 8.7 | 8.9 | 8.5 | 8.66 | 9.1 | 8.9 |

Example 1

Using the water-based inks, characters or images were printed on a corona discharge-treated PET "TAIKO Polyester Film FE2001" (water absorption of the printing medium as measured by contacting the printing medium with pure water for 100 milliseconds: 0 g/m$^2$) available from Futamura Chemical Co, Ltd., by the following ink-jet printing method.

(Ink-Jet Printing Method)

Under the environmental conditions of a temperature of 25±1° C. and a relative humidity of 30±5%, the water-based inks were loaded into a one-pass system print evaluation apparatus available from Trytech Co., Ltd., equipped with ink-jet print heads "KJ4B-HD06MHG-STDV" (piezoelectric type) available from Kyocera Corporation. These ink-jet print heads were sequentially disposed in the print evaluation apparatus in the order of the first ink (black ink) and the second ink (white ink) from an upstream side in the feeding direction of the printing medium. At this time, the ink-jet print heads respectively loaded with the black ink (Bk-1) and the white ink (W-1) were mounted in the print evaluation apparatus such that the ink-jet print heads were spaced at a distance of 35 cm apart from each other.

An A4-size film heater available from Kawai Corporation was fixedly mounted to a transportation table for the printing medium so as to heat the printing medium. The ejection conditions of the black ink were set to a print head-applied voltage of 26 V, a drive frequency of 10 kHz, an ejected ink droplet amount of 5 pL, a print head temperature of 32° C., a resolution of 600 dpi, the number of ink shots for flushing before being ejected of 200 shots and a negative pressure of −4.0 kPa, whereas the ejection conditions of the white ink were set to a print head-applied voltage of 26 V, a drive frequency of 10 kHz, an ejected ink droplet amount of 16 pL, a print head temperature of 32° C., a print head resolution of 600 dpi, the number of ink shots for flushing before being ejected of 200 shots and a negative pressure of −4.0 kPa. Then, the printing medium was fixed in the film heater such that the longitudinal direction of the printing medium was aligned with a transportation direction thereof.

A printing command was transmitted to the aforementioned print evaluation apparatus to eject the black ink to print a Duty 100% solid image having a size of 3 cm×3 cm on the printing medium, and then the white ink as an ink for a background image was ejected onto the printing medium to print a Duty 100% solid image having a size of 5 cm×5 cm such that an entire surface area of the solid image formed by the black ink was covered therewith. Thereafter, the thus obtained printed images on the printing medium were dried by a dryer at 60° C. for 5 minutes, thereby obtaining a printed material for evaluation of intercolor bleeding.

Examples 2 to 6 and Comparative Examples 1 and 2

The same procedure as in Example 1 was repeated except that the combination of the inks was changed to those shown in Table 3, thereby obtaining respective printed materials.
<Evaluation of Inks and Printed Materials>

The resulting printed materials were evaluated as to uniformity of solid image printing, intercolor bleeding and ejection properties by the following methods. The results are shown in Table 3.
(Evaluation of Uniformity of Solid Image Printing of White Ink)

The printed material was superimposed on a predetermined black paper such that a rear surface of the printed material opposed to the printed surface thereof was faced upward, to measure the image density of black thereof using a Macbeth densitometer available from GretagMacbeth AG. In this case, a lower image density of black means a higher hiding power of the printed material, and the value of the image density thus measured is defined as a degree of whiteness thereof. The more excellent the uniformity of solid image printing (solid image fillability) of the white ink becomes, the lower the degree of whiteness thereof is. The uniformity of solid image printing of the white ink was evaluated according to the following evaluation ratings.

A: Degree of whiteness was less than 0.75, and the uniformity of solid image printing was sufficient.

B: Degree of whiteness was not less than 0.75 and less than 0.80, and the uniformity of solid image printing was insufficient.

C: Degree of whiteness was not less than 0.80, and therefore posed significant problems upon practical use.
(Evaluation of Intercolor Bleeding of Printed Material)

The resulting printed material was observed from a rear side thereof opposed to a printed surface thereof using an optical microscope "VHX-5000" available from KEYENCE Corporation to magnify a boundary between the black ink and the white ink therein to thereby measure a bleed width therebetween. The intercolor bleeding of the printed material was evaluated according to the following evaluation ratings.

A: Bleed width was less than 50 μm.

B: Bleed width was not less than 50 μm and less than 150 μm, and the image quality was insufficient.

C: Bleed width was not less than 150 μm, and the image quality was extremely poor and therefore posed significant problems upon practical use.
(Evaluation of Ejection Properties of White Ink)

The resulting printed material was observed from a rear side of the printed material opposed to a printed surface thereof using an optical microscope "VHX-5000" available from KEYENCE Corporation to measure a distance from a start position to an end position of a non-printed portion in the printed solid image and further measure the time elapsed until the non-ejected distance was not less than 1 mm. The ejection properties of the white ink was evaluated according to the following evaluation ratings.

A: Time elapsed until the non-ejected distance was not less than 1 mm was not shorter than 15 minutes.

B: Time elapsed until the non-ejected distance was not less than 1 mm was not shorter than 5 minutes and shorter than 15 minutes, and therefore the white ink was insufficient in ejection properties.

C: Time elapsed until the non-ejected distance was not less than 1 mm was shorter than 5 minutes, and therefore the white ink was extremely deteriorated in ejection properties, and posed significant problems upon practical use.

TABLE 3

|  |  |  | Examples | | | | | | Comparative Examples | |
|---|---|---|---|---|---|---|---|---|---|---|
|  |  |  | 1 | 2 | 3 | 4 | 5 | 6 | 1 | 2 |
| First ink (black) | Kind of ink |  | Bk-1 | Bk-1 | Bk-1 | Bk-1 | Bk-1 | Bk-2 | Bk-1 | Bk-1 |
|  | Static surface tension ($T_1$) | mN/m | 28.8 | 28.8 | 28.8 | 28.8 | 28.8 | 26.9 | 28.8 | 28.8 |
|  | Viscosity at 32° C. ($V_1$) | mPa · s | 5.52 | 5.52 | 5.52 | 5.52 | 5.52 | 5.81 | 5.52 | 5.52 |
| Second ink (white) | Kind of ink |  | W-1 | W-2 | W-3 | W-4 | W-5 | W-2 | W-6 | W-7 |
|  | Static surface tension ($T_2$) | mN/m | 26.1 | 26.5 | 26.6 | 26.4 | 26.1 | 26.5 | 26.6 | 29.1 |

TABLE 3-continued

|  |  |  | Examples | | | | | | Comparative Examples | |
|---|---|---|---|---|---|---|---|---|---|---|
|  |  |  | 1 | 2 | 3 | 4 | 5 | 6 | 1 | 2 |
|  | Viscosity at 32° C. ($V_2$) | mPa·s | 9.8 | 12.15 | 12.23 | 15.12 | 20.05 | 12.15 | 5.14 | 11.12 |
| Difference in static surface tension ($T_2 - T_1$) | | | −2.7 | −2.3 | −2.2 | −2.4 | −2.7 | −0.4 | −2.2 | 0.3 |
| Difference in viscosity at 32° C. ($V_2 - V_1$) | | | 4.28 | 6.63 | 6.71 | 9.6 | 14.53 | 6.34 | −0.38 | 5.6 |
| Evaluation of printing | Uniformity of solid image printing (degree of whiteness) | — (—) | A (0.71) | A (0.64) | A (0.59) | A (0.62) | A (0.74) | A (0.64) | B (0.79) | A (0.64) |
|  | Intercolor bleeding (bleed width) | — (μm) | A (30) | A (22) | A (20) | A (5) | A (0) | A (29) | C (155) | B (73) |
|  | Ejection properties of white ink (intermittent time) | — (min) | A (18) | A (25) | A (23) | A (15) | B (13) | A (25) | A (18) | A (20) |

From the comparison of Examples 1 to 6 and Comparative Examples 1 and 2 as shown in Table 3, it was confirmed that the ink-jet printing methods of the Examples according to the present invention were capable of obtaining good printed characters or images which were excellent in uniformity of solid image printing and suffered from less intercolor bleeding, and could also exhibit excellent ejection properties, as compared to the ink-jet printing methods of the Comparative Examples.

In addition, from the standpoint of evaluating uniformity of solid image printing and intercolor bleeding, there were illustrated the cases where the black ink was used as the first ink (image-forming ink), and the white ink was used as the second ink (ink for a background image). However, for example, even though any of a magenta ink, a yellow ink and a cyan ink is used instead as the image-forming ink, it is possible to exhibit the same effect as attained by the present invention.

INDUSTRIAL APPLICABILITY

According to the ink-jet printing method and the ink set of the present invention, it is possible to obtain good printed characters or images which are excellent in uniformity of solid image printing of a background image upon reverse printing, and suffer from less intercolor bleeding.

The invention claimed is:

1. An ink-jet printing method of overprinting a first ink and a second ink on a low-liquid absorbing printing medium, in which:
the first ink and the second ink are respectively in the form of a water-based ink comprising a colorant (A), a polymer (B), an organic solvent (C) and water;
the colorant (A) of the first ink is at least one pigment selected from the group consisting of chromatic organic pigments and carbon black;
the colorant (A) of the second ink is a white pigment; and
a static surface tension and a viscosity of the first ink and a static surface tension and a viscosity of the second ink satisfy a relationship represented by the following formulae (1) and (2):

$$[T_2-T_1]<0 \text{ mN/m} \quad (1); \text{ and}$$

$$[V_2-V_1]\geq 1.0 \text{ mPa·s} \quad (2),$$

wherein $T_2$ is the static surface tension of the second ink; $T_1$ is the static surface tension of the first ink; $V_2$ is the viscosity of the second ink as measured at 32° C.; and $V_1$ is the viscosity of the first ink as measured at 32° C., said ink-jet printing method comprising the steps of forming characters or images using at least one ink as the first ink, and then forming a background image using the second ink such that the background image is superimposed on at least a part of the characters or images formed by the first ink.

2. The ink-jet printing method according to claim 1, wherein the viscosity of the second ink as measured at 32° C. is not less than 7 mPa·s and not more than 25 mPa·s.

3. The ink-jet printing method according to claim 1, wherein the low-liquid absorbing printing medium is a resin film.

4. The ink-jet printing method according to claim 3, wherein the resin film is a corona discharge-treated polyester film or a corona discharge-treated oriented polypropylene film.

5. The ink-jet printing method according to claim 1, wherein before the first ink is dried, the background image is formed by the second ink.

6. The ink-jet printing method according to claim 1, wherein the white pigment comprises titanium oxide.

7. The ink-jet printing method according to claim 1, wherein the polymer (B) is a vinyl-based polymer.

8. The ink-jet printing method according to claim 1, wherein a weight-average molecular weight of the polymer (B) is not less than 10,000 and not more than 2,500,000.

9. The ink-jet printing method according to claim 1, wherein the polymer (B) comprises a pigment dispersing polymer (B-1) and a fixing aid polymer (B-2).

10. The ink-jet printing method according to claim 1, wherein the organic solvent (C) is at least one compound selected from the group consisting of a polyhydric alcohol (c-1) and a glycol ether (c-2).

11. An ink set comprising at least one first ink and a second ink, in which the first ink is an ink for forming characters or images, and the second ink is an ink for forming a background image;
the first ink and the second ink are respectively in the form of a water-based ink comprising a colorant (A), a polymer (B), an organic solvent (C) and water;
the colorant (A) of the first ink is at least one pigment selected from the group consisting of chromatic organic pigments and carbon black;
the colorant (A) of the second ink is a white pigment; and
a static surface tension and a viscosity of the first ink and a static surface tension and a viscosity of the second ink satisfy a relationship represented by the following formulae (1) and (2):

$$[T_2-T_1]<0 \text{ mN/m} \quad (1); \text{ and}$$

$$[V_2-V_1]\geq 1.0 \text{ mPa·s} \quad (2),$$

wherein $V_2$ is the viscosity of the second ink as measured at 32° C.; $V_1$ is the viscosity of the first ink as measured at 32° C.; $T_2$ is the static surface tension of the second ink; and $T_1$ is the static surface tension of the first ink.

* * * * *